(12) United States Patent
Ostrovsky et al.

(10) Patent No.: US 10,796,154 B2
(45) Date of Patent: Oct. 6, 2020

(54) METHOD OF IMAGE-BASED RELATIONSHIP ANALYSIS AND SYSTEM THEREOF

(71) Applicant: BIONIC 8 ANALYTICS LTD., Hod Hasharon (IL)

(72) Inventors: Andrey Ostrovsky, Petach-Tikva (IL); Marina Orenstein, Yehud (IL); Tal Zahavi, Kiryat Ono (IL)

(73) Assignee: BIONIC 8 ANALYTICS LTD., Hod Hasharon (IL)

(*) Notice: Subject to any disclaimer, the term of this patent is extended or adjusted under 35 U.S.C. 154(b) by 46 days.

(21) Appl. No.: 16/016,946

(22) Filed: Jun. 25, 2018

(65) Prior Publication Data

US 2019/0392201 A1 Dec. 26, 2019

(51) Int. Cl.
*G06K 9/00* (2006.01)
(52) U.S. Cl.
CPC ..... *G06K 9/00677* (2013.01); *G06K 9/00288* (2013.01); *G06T 2207/30201* (2013.01)
(58) Field of Classification Search
CPC .................................................. G06K 9/00677
See application file for complete search history.

(56) References Cited

U.S. PATENT DOCUMENTS

| 2009/0292549 | A1 | 11/2009 | Ma et al. | |
|---|---|---|---|---|
| 2010/0106573 | A1 | 4/2010 | Gallagher et al. | |
| 2011/0211736 | A1* | 9/2011 | Krupka | G06K 9/00677 382/118 |
| 2012/0087548 | A1* | 4/2012 | Wu | G06K 9/00677 382/115 |
| 2015/0193471 | A1* | 7/2015 | Shochat | G06K 9/00221 707/722 |

* cited by examiner

*Primary Examiner* — Casey L Kretzer
(74) *Attorney, Agent, or Firm* — Browdy and Neimark, P.L.L.C.

(57) ABSTRACT

There are provided a system and method of image-based relationship analysis, the method including: obtaining a set of target images each including one or more image representations of one or more individuals, obtaining, for each image representation, a corresponding vector representation, clustering the multiple vector representations to a plurality of clusters of vector representations corresponding to a plurality of unique individuals, and obtaining, for each target image, one or more unique individuals associated therewith, for each given target image of at least one subset of the set, obtaining a set of image parameters; generating a local relationship matrix using the set of image parameters, the local relationship matrix being representative of local mutual relationships between the one or more unique individuals, thereby obtaining a set of local relationship matrices, and generating a global relationship matrix by combining a set of local relationship matrices.

25 Claims, 10 Drawing Sheets

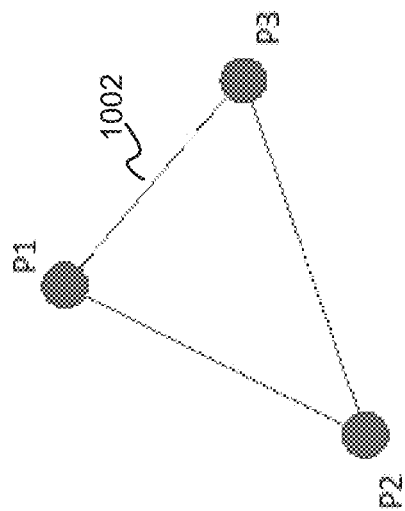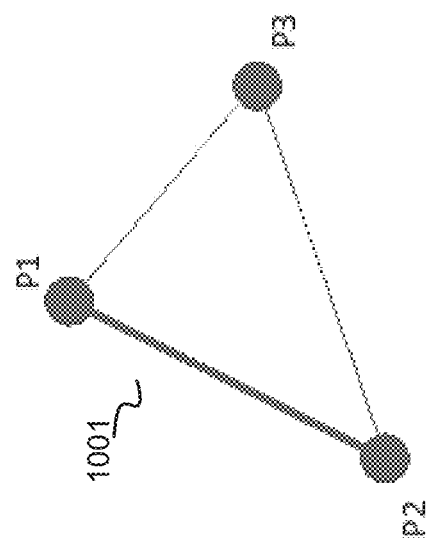
FIG. 10

METHOD OF IMAGE-BASED RELATIONSHIP ANALYSIS AND SYSTEM THEREOF

TECHNICAL FIELD

The presently disclosed subject matter relates, in general, to the field of relationship analysis, and more specifically, to methods and systems for image-based relationship analysis.

BACKGROUND

Relationship analysis, or social link analysis, aims at examining relationships between individuals who interact by some means between themselves. The end result of such an analysis process can be described through different representations.

The interactions between individuals are typically measured through the examination of communications and interests. For example, in an organization or a specific community, the amount of unique phone calls or emails sent between individuals could indicate not only a relationship, but also its intensity. In another example, if several individuals share similar sports interests, and, more specifically, even are fans of the same football team, this may suggest affiliations and relationship.

However, current social relationship analysis is limited to the input of social events which need to be collected/extracted from multiple unrelated sources of communications and social media channels, in which there exist inherent issues such as data access, data errors, and time-consuming and costly data transformation and analysis.

General Description

In accordance with certain aspects of the presently disclosed subject matter, there is provided a computerized method of image-based relationship analysis, the method comprising: obtaining a set of target images each including one or more image representations of one or more individuals; obtaining, for each image representation in each target image, a corresponding vector representation generated by a Facial Recognition Model (FRM), thereby providing multiple vector representations corresponding to multiple image representations of individuals included in the set of target images; clustering the multiple vector representations to a plurality of clusters of vector representations corresponding to a plurality of unique individuals included in the set of target images using a similarity measure, and obtaining, for each target image, one or more unique individuals associated therewith; for each given target image of at least one subset of the set, obtaining a set of image parameters characterizing the given target image, wherein the set of image parameters includes at least one computed parameter indicative of a relationship measurement between the one or more unique individuals associated with the given target image; generating a local relationship matrix using the set of image parameters, wherein the local relationship matrix is representative of local mutual relationships between the one or more unique individuals; thereby obtaining a set of local relationship matrices corresponding to the at least one subset of target images; and generating a global relationship matrix by combining the set of local relationship matrices, the global relationship matrix being representative of relationships between the plurality of unique individuals.

In addition to the above features, the method according to this aspect of the presently disclosed subject matter can comprise one or more of features (i) to (xiv) listed below, in any desired combination or permutation which is technically possible:

(i). The method can further comprise depicting a social map based on the global relationship matrix, wherein the social map is a graphical representation of relationships between the plurality of unique individuals.

(ii). The obtaining a corresponding vector representation can comprise for each given target image, generating, using the FRM, a vector representation corresponding to each image representation of an individual included therein.

(iii). The Facial Recognition Model can be trained using a training set of images targeted for a specific group of individuals. Each image in the training set can be pre-tagged with one or more unique individuals included therein.

(iv). The training set of images can comprise a plurality of subsets of images, each subset pre-tagged with a respective individual from the specific group. The plurality of subsets of images can be filtered prior to being used for training the Facial Recognition Model so as to increase accuracy of the FRM.

(v). The FRM can be trained by: for each given subset of images pre-tagged with a respective individual: feeding the Facial Recognition Model with the given subset of images to obtain a cluster of vector representations representing the respective individual in the given subset of images; applying a similarity measure to the cluster, giving rise to a reduced cluster of vector representations corresponding to a filtered subset of images; thereby obtaining a plurality of filtered subsets corresponding to respective individuals; and feeding the Facial Recognition Model with the plurality of filtered subsets so as to train the Facial Recognition Model.

(vi). The similarity measure can be applied by measuring a distance between each vector representation and center of the cluster, and comparing the distance with a threshold.

(vii). The clustering can comprise generating a similarity matrix comprising elements each indicative of similarity between a respective pair of vector representations using the similarity measure, and determining one or more vector representations that are indicated to be similar by the similarity matrix representing the same unique individual.

(viii). The method can further comprise filtering the set of target images based on the plurality of clusters, giving rise to the at least one subset.

(ix). The at least one computed parameter can include a distance matrix indicative of relative distances between the one or more unique individuals associated with the given target image.

(x). The at least one computed parameter can further include one or more additional computed parameters selected from a group comprising: number of unique individuals associated therewith, individual-specific vector, and image-related vector.

(xi). The set of image parameters can further include a subset of pre-submitted parameters and/or a subset of physical parameters.

(xii). The local relationship matrix can be informative of strength of the local mutual relationships between the one or more unique individuals.

(xiii). The method can further comprise, for each given target image, deriving a weight using the set of image parameters, the weight being indicative of significance of the given target image. The global relationship matrix can be generated by combining the local relationship matrix corresponding to each target image with respect to the respective weight thereof.

(xiv). The global relationship matrix can have a dimension corresponding to the number of unique individuals, and the global relationship matrix can be generated by mapping each local relationship matrix into the dimension according to index of the unique individuals associated therewith in the global relationship matrix.

In accordance with other aspects of the presently disclosed subject matter, there is provided a computerized system of image-based relationship analysis, the system comprising a processing and memory circuitry (PMC) configured to: obtain a set of target images each including one or more image representations of one or more individuals; obtain, for each image representation in each target image, a corresponding vector representation generated by a Facial Recognition Model (FRM), thereby providing multiple vector representations corresponding to multiple image representations of individuals included in the set of target images; cluster the multiple vector representations to a plurality of clusters of vector representations corresponding to a plurality of unique individuals included in the set of target images using a similarity measure, and obtain, for each target image, one or more unique individuals associated therewith; for each given target image of at least one subset of the set, obtain a set of image parameters characterizing the given target image, wherein the set of image parameters includes at least one computed parameter indicative of a relationship measurement between the one or more unique individuals associated with the given target image; generate a local relationship matrix using the set of image parameters, wherein the local relationship matrix is representative of local mutual relationships between the one or more unique individuals; thereby obtaining a set of local relationship matrices corresponding to the at least one subset of target images; and generate a global relationship matrix by combining the set of local relationship matrices, the global relationship matrix being representative of relationships between the plurality of unique individuals.

This aspect of the disclosed subject matter can comprise one or more of features (i) to (xiv) listed above with respect to the method, mutatis mutandis, in any desired combination or permutation which is technically possible.

In accordance with other aspects of the presently disclosed subject matter, there is provided a non-transitory computer readable medium comprising instructions that, when executed by a computer, cause the computer to perform a method of image-based relationship analysis, the method comprising: obtaining a set of target images each including one or more image representations of one or more individuals; obtaining, for each image representation in each target image, a corresponding vector representation generated by a Facial Recognition Model (FRM), thereby providing multiple vector representations corresponding to multiple image representations of individuals included in the set of target images; clustering the multiple vector representations to a plurality of clusters of vector representations corresponding to a plurality of unique individuals included in the set of target images using a similarity measure, and obtaining, for each target image, one or more unique individuals associated therewith; for each given target image of at least one subset of the set, obtaining a set of image parameters characterizing the given target image, wherein the set of image parameters includes at least one computed parameter indicative of a relationship measurement between the one or more unique individuals associated with the given target image; generating a local relationship matrix using the set of image parameters, wherein the local relationship matrix is representative of local mutual relationships between the one or more unique individuals; thereby obtaining a set of local relationship matrices corresponding to the at least one subset of target images; and generating a global relationship matrix by combining the set of local relationship matrices, the global relationship matrix being representative of relationships between the plurality of unique individuals.

This aspect of the disclosed subject matter can comprise one or more of features (i) to (xiv) listed above with respect to the method, mutatis mutandis, in any desired combination or permutation which is technically possible.

BRIEF DESCRIPTION OF THE DRAWINGS

In order to understand the invention and to see how it may be carried out in practice, embodiments will now be described, by way of non-limiting example only, with reference to the accompanying drawings, in which:

FIG. 10 illustrates two exemplary social maps in accordance with certain embodiments of the presently disclosed subject matter.

DETAILED DESCRIPTION OF EMBODIMENTS

Figure 1:
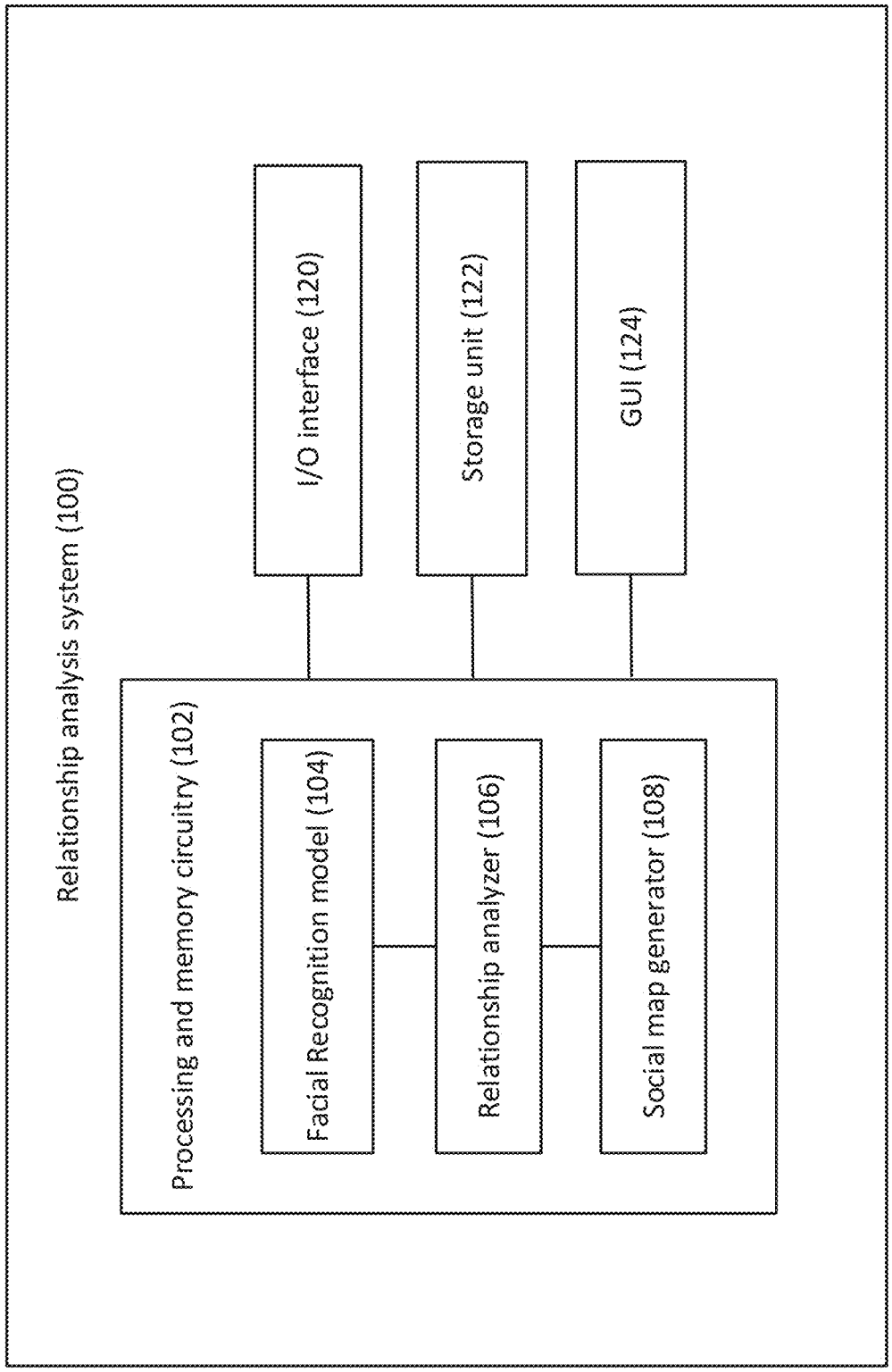
FIG. 1 schematically illustrates a block diagram of a computerized system of image-based relationship analysis in accordance with certain embodiments of the presently disclosed subject matter.

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "obtaining", "identifying", "generating", "providing", "clustering", "depicting", "training", "feeding", "applying", "measuring", "selecting", "filtering", "deriving", "mapping", "associating", or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the computerized system of image-based relationship analysis and the processing and memory circuitry (PMC) thereof disclosed in the present application.

The operations in accordance with the teachings herein can be performed by a computer specially constructed for the desired purposes or by a general purpose computer specially configured for the desired purpose by a computer program stored in a non-transitory computer readable storage medium.

The terms "non-transitory memory", "non-transitory storage medium" and "non-transitory computer readable storage medium" used herein should be expansively construed to cover any volatile or non-volatile computer memory suitable to the presently disclosed subject matter.

Embodiments of the presently disclosed subject matter are not described with reference to any particular programming language. It will be appreciated that a variety of programming languages may be used to implement the teachings of the presently disclosed subject matter as described herein.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

In certain embodiments of the presently disclosed subject matter, one or more stages may be executed in a different order and/or one or more groups of stages may be executed simultaneously and vice versa.

Bearing this in mind, attention is drawn to FIG. 1, schematically illustrating a block diagram of a computerized system of an image-based relationship analysis in accordance with certain embodiments of the presently disclosed subject matter.

The system 110 illustrated in FIG. 1 is a computer-based system capable of analyzing relationships between individuals based on images. As aforementioned, current relationship analysis tools are normally based on limited data resources which are often unrelated and ununiformed, thus inherently suffering from issues such as, e.g., time-consuming and costly data transformation and analysis, etc. One medium which is usually neglected when assessing relationships, especially when done by automated means, are images. The images used herein refer to photographs (sometimes arranged in batches or albums) of people which may demonstrate interactions, relationships and in some cases even relationship strength between them. It is to be noted that the terms images, photos and pictures are used interchangeably in the present disclosure.

System 100 can be configured to obtain, via a hardware-based I/O interface 120, a set of target images each including one or more image representations of one or more individuals. The set of target images can be obtained/retrieved from any internal or external storage or image acquisition devices, such as, e.g., a local storage unit 122, an external digital camera, or certain external data repositories operatively connected to system 100.

Once the set of target images is obtained, these images need to be analyzed in order to provide information regarding relationships between unique individuals comprised therein. Such image-based relationship analysis can present certain challenges. For example, for a batch of native photographs (a native photograph refers to a typical image that may include one or more individuals in their natural surroundings and environment) which are expected to include a number of individuals with certain social interactions existing between at least some of them, one or more of the following issues may arise when performing the analysis:

Varying Image Quality

The physical characteristics/parameters of a specific image may vary. This can relate to, by way of example, the original image size, resolution, color and brightness, focus quality, etc. Low quality images may present a barrier when trying to extract information therefrom, and/or when being used for training or tuning purposes, which may create unnecessary noise thus can defocus and degrade the quality of the analysis overall.

Varying Image Significance

Not all images are created equally from a social significance related perspective, i.e., some images can be more important than others in terms of deriving relationships between individuals. As described in further detail below, in some cases, such significance estimation can be indicated by information which is 'buried' within the image. In some other cases, the significance estimation may be given as a preliminary input submitted with the image itself. By way of example, such pre-submitted parameters can be provided in a relative manner (e.g., image X is more important than image Y).

Cluttered Images

Photographs may contain more than one individual but may also include other objects which are irrelevant for the analysis itself. This issue is even more amplified when taking into account varying image quality and flexible facial geometries (e.g., angle of 'photo shooting').

Accuracy Issues

Various factors can cause accuracy issues. As described below, the individuals can be identified using a Facial Recognition Model (FRM). FRM is typically trained over a large population set and in some cases may expect a certain image format and facial representation assembly in order to maximize precision (e.g., front facial, centered). In practical cases, the population segments for which the relationship analysis is applied for may have some distinctive (or differentiated) characteristics (e.g., children) which can be suppressed if handled by a generic recognition engine. In some cases, some of the images may be pre-tagged with information regarding the individuals within a specific image, such as their inclusion and names. Yet relying completely on the existence of such information, or using it as some baseline authenticity, may be a questionable practice.

Relationship Deduction

Even if all of the above issues are handled and alleviated, there still remains the essential issue, i.e., how to deduce relationships between individuals, which is to be established solely by photographic input.

The presently disclosed subject matter aims to address the above issues so as to effectively conduct image-based relationship analysis. Referring back to FIG. 1, as illustrated, system 100 can comprise a processing and memory circuitry (PMC) 102 operatively connected to the I/O interface 120 and a storage unit 122. PMC 102 is configured to provide all processing necessary for operating system 100 which is further detailed with reference to FIGS. 2-3. PMC 102 comprises a processor (not shown separately) and a memory (not shown separately). The processor of PMC 102 can be configured to execute several functional modules in accordance with computer-readable instructions implemented on a non-transitory computer-readable memory comprised in the PMC. Such functional modules are referred to hereinafter as comprised in the PMC. It is to be noted that the term processor referred to herein should be expansively construed to cover any processing circuitry with data processing capabilities, and the present disclosure is not limited to the type or platform thereof, or number of processing cores comprised therein.

In certain embodiments, functional modules comprised in the PMC 102 can comprise a relationship analyzer 106. Optionally, the functional modules can further comprise a Facial Recognition Model 104, and/or a social map generator 108, as described below. The functional modules comprised in the PMC are operatively connected with each other.

The PMC 102 can be configured to obtain, for each image representation in each target image, a corresponding vector representation, thereby providing multiple vector representations corresponding to multiple image representations of individuals included in the set of target images. The vector representation can be generated by a Facial Recognition Model (FRM). In some embodiments, the functionality of the FRM can be integrated with the PMC 102, in which case the FRM can be regarded as an internal component of system 100, as illustrated as the FRM 104 comprised in FIG. 1. However, this is for illustration purpose only and does not intend to limit the present disclosure in any way. In some other embodiments, the FRM can reside externally to system 100 and can be operatively connected to system 100. In such cases, the vector representations generated by the FRM are thus received by the PMC 102 via the I/O interface 120. The relationship analyzer 106 can be configured to cluster the multiple vector representations to a plurality of clusters of vector representations corresponding to a plurality of unique individuals included in the set of target images using a similarity measure, and obtain, for each target image, one or more unique individuals associated therewith. The relationship analyzer 106 can be further configured to, for each given target image of at least one subset of the set, obtain a set of image parameters characterizing the given target image and generate a local relationship matrix using the set of image parameters. The set of image parameters includes at least one parameter indicative of a relationship measurement between the one or more unique individuals associated with the given target image. The local relationship matrix is representative of local mutual relationships between the one or more unique individuals. Therefore, a set of local relationship matrices corresponding to the set of target images can be obtained. The relationship analyzer 106 can be further configured to generate a global relationship matrix by combining the set of local relationship matrices. The global relationship matrix is representative of relationships between the plurality of unique individuals. In some embodiments, the PMC can further comprise a social map generator 108 configured to depict a social map based on the global relationship matrix, wherein the social map is a graphical representation of relationships between the plurality of unique individuals. Details of these operations will be described in further detail below with reference to FIG. 2.

In some embodiments, the storage unit 122 can include an image database (not illustrated separately) which can be configured to store necessary inputs and outputs, as well as intermediate processing results, such as, e.g., the set of target images, vector representations, and/or the social map as generated. The target images can be pre-acquired and stored in the image database which can be retrieved by the PMC. It is to be noted that although the storage unit is illustrated in FIG. 1 as being comprised in system 100, this is for purpose of illustration only and should not be deemed as limiting the present disclosure in any way. In some cases, the image database can reside external to system 100, e.g., in certain external data repositories, or in an external system or provider, and the target images can be retrieved via the I/O interface 120.

Optionally, system 100 can further comprise a graphical user interface (GUI) 124 configured to render for display of the input and/or the output to the user. For instance, the social map as a graphical representation can be displayed to the user via the GUI. Optionally, the GUI can be configured to enable user-specified inputs for operating system 100.

The system 100 can be used for relationship analysis for various purposes and applications, such as, e.g., social networks, security related applications, etc. It is to be appreciated that the present disclosure is not limited by any specific usage and application of the system.

It is also noted that the system illustrated in FIG. 1 can be implemented in a distributed computing environment, in which the aforementioned functional modules comprised therein can be distributed over several local and/or remote devices, and can be linked through a communication network.

Those versed in the art will readily appreciate that the teachings of the presently disclosed subject matter are not bound by the systems illustrated in FIG. 1; equivalent and/or modified functionality can be consolidated or divided in another manner and can be implemented in any appropriate combination of software with firmware and hardware. The system in FIG. 1 can be standalone network entities, or integrated, fully or partly, with other network entities. Those skilled in the art will also readily appreciate that the database therein can be shared with other systems or be provided by other systems, including third party equipment.

Figure 2:
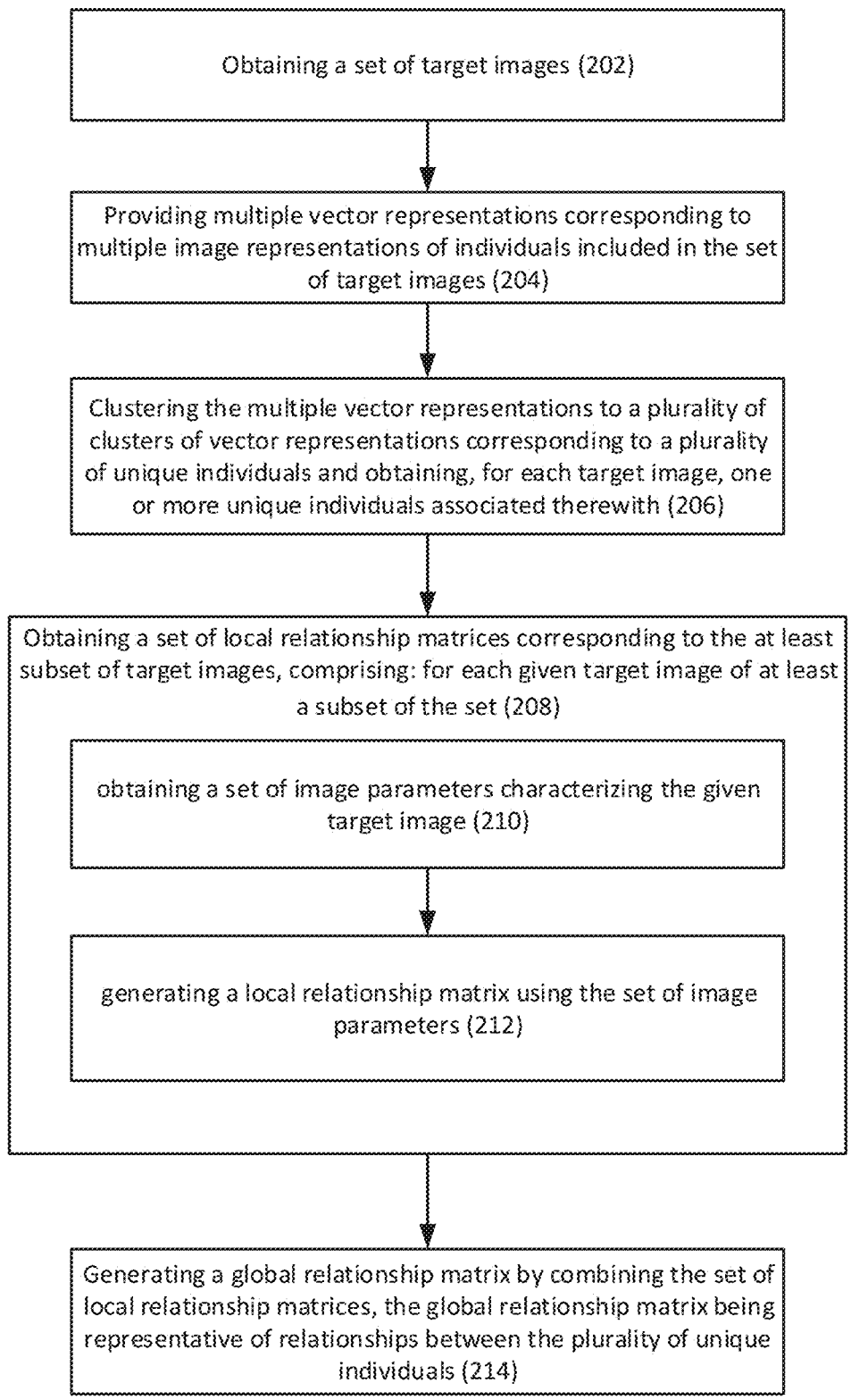
FIG. 2 illustrates a generalized flowchart of image-based relationship analysis in accordance with certain embodiments of the presently disclosed subject matter.
Figure 3:
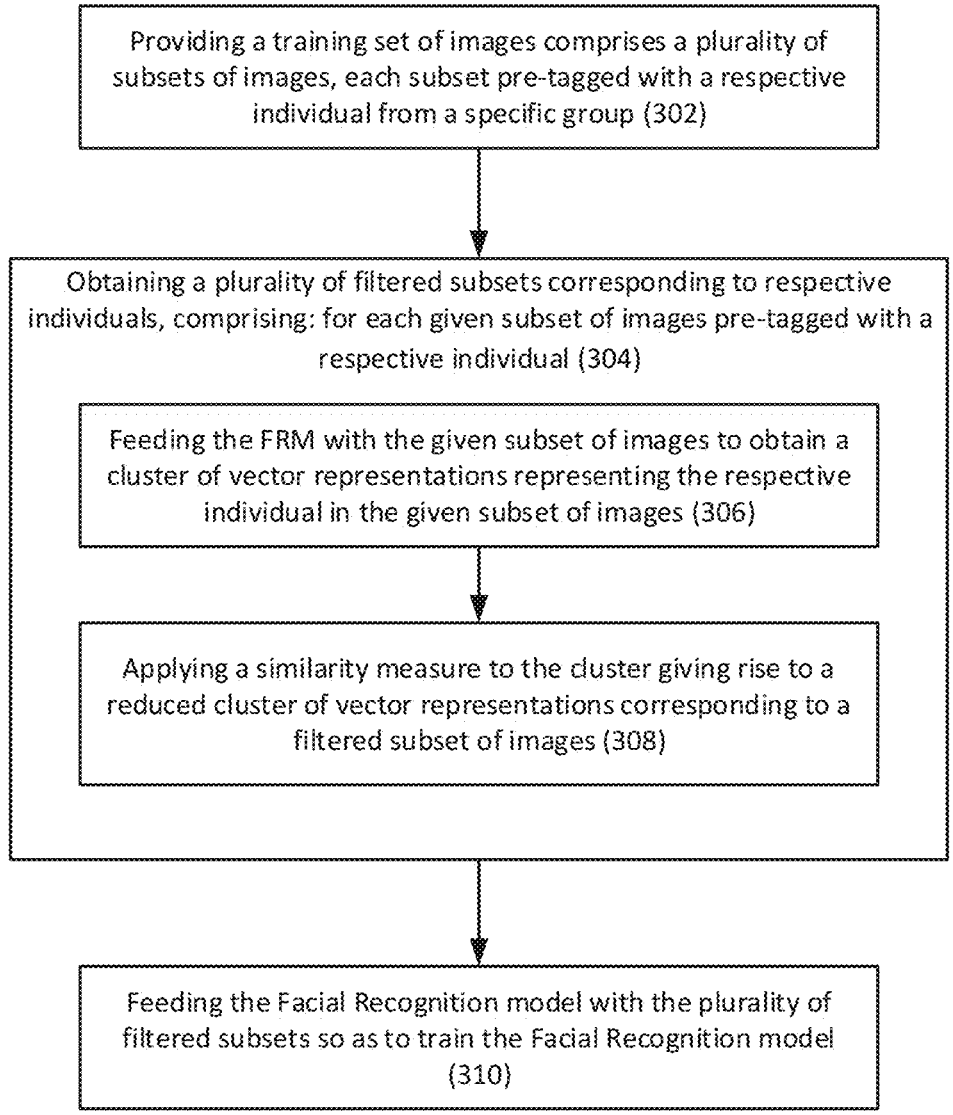
FIG. 3 illustrates a generalized flowchart of a training process of the Facial Recognition Model in accordance with certain embodiments of the presently disclosed subject matter.

While not necessarily so, the process of operation of system 100 can respectively correspond to some or all of the stages of the methods described with respect to FIGS. 2-3. Likewise, the methods described with respect to FIGS. 2-3 and their possible implementations can be respectively implemented by system 100. It is therefore noted that embodiments discussed in relation to the methods described with respect to FIGS. 2-3 can also be implemented, mutatis mutandis as various embodiments of the system 100, and vice versa.

Referring now to FIG. 2, there is illustrated a generalized flowchart of image-based relationship analysis in accordance with certain embodiments of the presently disclosed subject matter.

A set of target images can be obtained (202) (e.g., by the PMC 102 via I/O interface 120, or from the storage unit 122, as illustrated in FIG. 1). Each target image includes one or more image representations of one or more individuals. In some embodiments, the set of target images can be targeted for a specific group of individuals, e.g., a specific age group or ethnicity or organization, etc. Image representation of an individual refers to image data representing/characterizing visual features of an individual (i.e., the individual's appearance) in the image. By way of example, one image may include three individuals A, B and C, thus having three image representations corresponding to the three individuals. By way of another example, the same person A may appear in two different images, thus each image includes a respective image representation of A. The set of images can be in any known suitable formats, types, sizes and resolutions, and the present disclosure is not limited to such specifics of the images.

For each image representation in each target image, a corresponding vector representation (also referred to herein as vector) can be obtained (204) (e.g., by the PMC 102 via I/O interface 120, or from the storage unit 122, as illustrated in FIG. 1), thereby providing multiple vector representations corresponding to multiple image representations of individuals included in the set of target images. In some embodiments, the vector representation corresponding to each image representation can be generated by a Facial Recognition Model (FRM) (also referred to as Facial Recognition Engine, or FRE). An exemplary implementation of such a model can take a facial image of an individual and output a multi-dimensional (e.g., Q-dimensional) vector representation, i.e., a list of Q numbers, which represent a digital feature extraction of the face processed by the model, where different dimensions represent different features of the faces. Each target image in the set is processed by the FRM and one or more vector representations, representing one or more people appearing in the target image, are generated.

To some extent, the vector representations can be used as a form of identification or differentiation. For example, assuming that using the FRM, a photo of person X results in vector Vx and a photo of person Y results in vector Vy. If the difference between Vx and Vy is relatively large, then it is likely that these are photos of different individuals. However, if the difference is relatively small, then it is likely that these are photos of the same person.

Although there are various off-the-shelf FRM products available to be used, it is important to note that, as aforementioned, most FRMs are pre-trained on a relatively large and generic population set which may affect its accuracy when being used for specific and unique population segments (e.g., the set of target images described above) which are typically much narrower than generic and have some pre-differentiated characteristics. Therefore, the FRE needs to be fine-tuned or re-trained by exposing it to a number of photos specifically chosen for this purpose, prior to using it for generating the vector representations.

Referring now to FIG. 3, there is illustrated a generalized flowchart of a training process of the Facial Recognition Model in accordance with certain embodiments of the presently disclosed subject matter.

In some embodiments, the Facial Recognition Model can be trained/fine-tuned using a training set of images targeted for a specific group of individuals. Each image in the training set is pre-tagged with one or more unique individuals included therein. Specifically, the training set of images can be provided (302) as comprising a plurality of subsets of images, each subset pre-tagged with a respective individual from the specific group. For instance, the training set can comprise a first subset of images each pre-tagged with person A, a second subset of images each pre-tagged with person B, etc. In some cases, due to the aforementioned issues related to varying image qualities, varying image significance, cluttered images etc., the plurality of subsets of images can be filtered prior to being used for training the Facial Recognition Model so as to increase accuracy of the FRM. A plurality of filtered subsets corresponding to respective individuals can thus be obtained (304). Specifically, for each given subset of images pre-tagged with a respective individual, the Facial Recognition Model can be fed (306) with the given subset of images to obtain a cluster of vector representations representing the respective individual in the given subset of images. A similarity measure can be applied (308) to the cluster giving rise to a reduced cluster of vector representations corresponding to a filtered subset of images. Once the plurality of filtered subsets corresponding to respective individuals are obtained, the Facial Recognition Model can be trained (310) by feeding the FRM with the plurality of filtered subsets for training.

Figure 4:
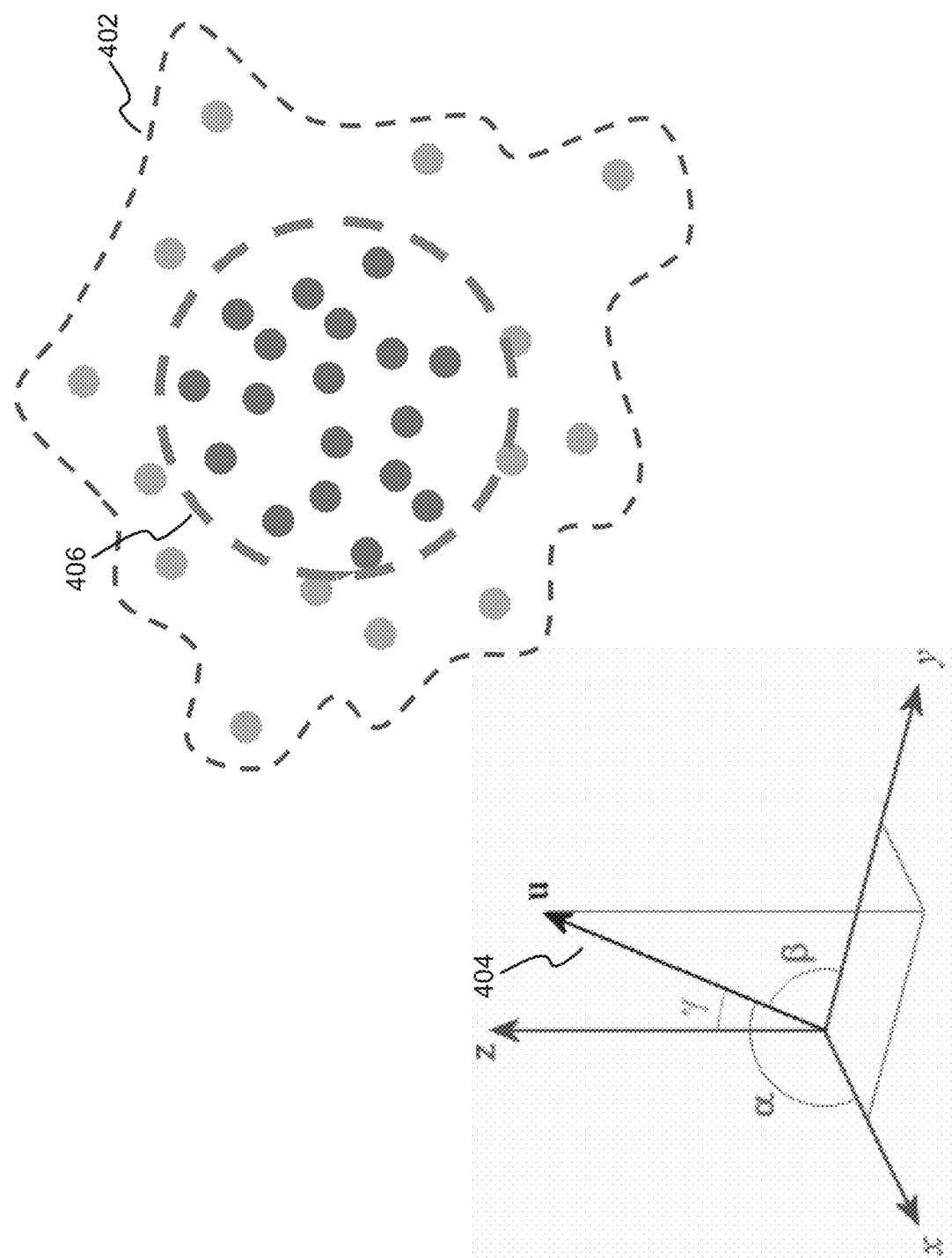
FIG. 4 illustrates an exemplified illustration of filtering a subset of images pre-tagged with a specific individual for FRM training in accordance with certain embodiments of the presently disclosed subject matter.

Reference is now made to FIG. 4, illustrating an exemplified illustration of filtering a subset of images pre-tagged with a specific individual for FRM training in accordance with certain embodiments of the presently disclosed subject matter.

The subset of N images are fed to the FRE and a cluster 402 of N vector representations representing the specific individual in the subset of images is illustrated. Each vector representation represents a multi-dimensional digital feature extraction of a corresponding image. An exemplified Q-dimensional vector representation in feature space is illustrated as 404. In an ideal state, if the images were of perfect quality and the FRM was perfectly tuned, then it can be expected that the cluster size will be significantly small, as all images are of the same individual and should have an almost identical vector representation. However, in a practical case, the cluster size is not negligible as, due to accuracy issues, the images are translated into vector representations which only approximately point to a similar 'direction' in the Q-dimensional space, forming the cluster 402. For purpose of filtration, a similarity measure can be applied to the cluster 402. By way of example, a threshold can be set to define a border line of acceptance, i.e., which images can be associated with the specific individual and which images should be filtered out. The end result is that out of the subset of N images which were pre-tagged with the same person, only N' images will remain (N'<N), constituting a reduced cluster 406 of vector representations corresponding to a filtered subset of images. The border line can be determined, e.g., by certain distance deviation measurement. For instance, a distance between each vector representation and center of the cluster can be measured and the distance can be compared with a predetermined threshold. This filtered subset of N' images can be considered as a clean version of the original batch, which can be used for tuning the FRM during the training phase.

Figure 5:
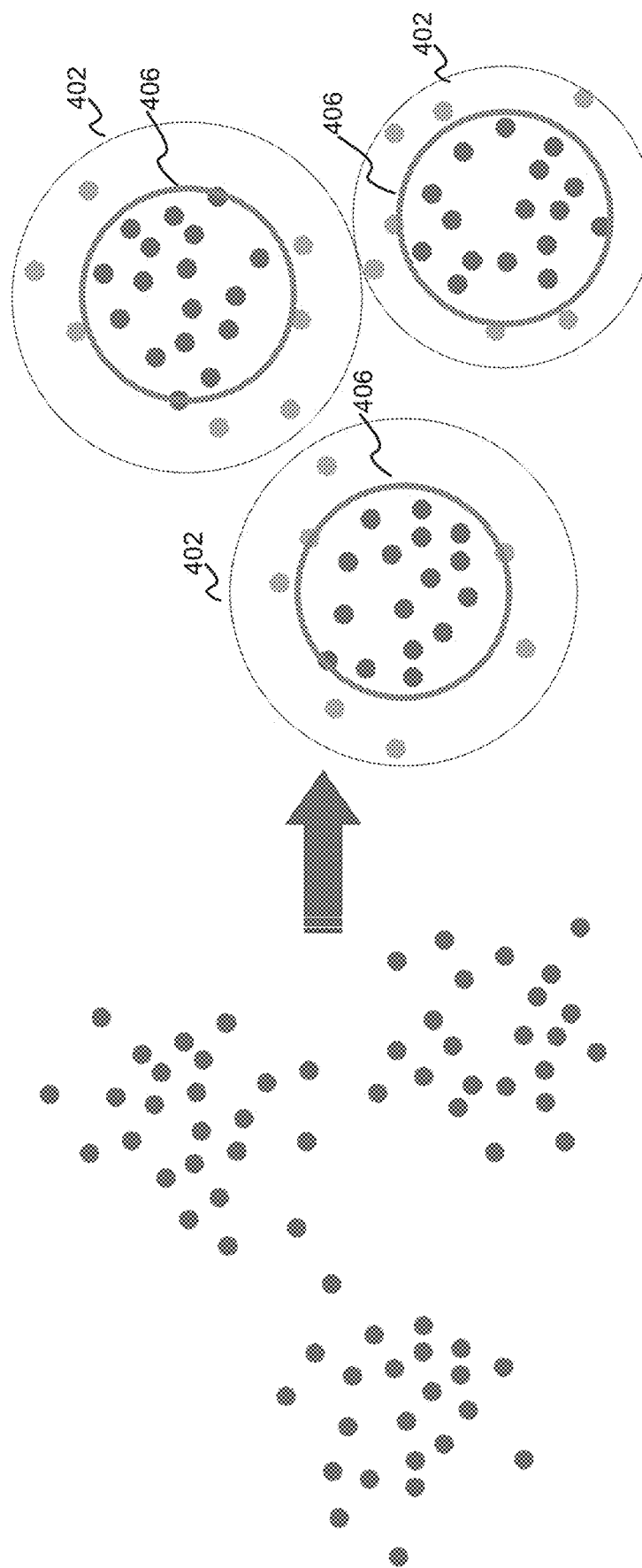
FIG. 5 is an exemplary illustration of multiple clusters of vector representations and corresponding reduced clusters in accordance with certain embodiments of the presently disclosed subject matter.

The above described process can be repeated for all the pre-tagged subsets of images of all individuals in the specific group. Referring now to FIG. 5, there is an exemplary illustration of multiple clusters of vector representations and corresponding reduced clusters in accordance with certain embodiments of the presently disclosed subject matter. As shown, for multiple subsets of N images corresponding to respective individuals, the vector presentations will form multiple clusters 402 of N vector representations each representing a specific individual, as illustrated in FIG. 5. By applying similar filtering techniques as described with reference to FIG. 4, multiple reduced clusters 406 of vector representations can be obtained, corresponding to multiple filtered subsets of images, which can then be used for training the FRM.

The FRM trained in such a manner is fine-tuned for targeting a specific group of population and has an improved level of accuracy for identifying individuals in the specific group, as compared to the un-trained FRM. The trained FRM can be used for processing the set of target images, as received in block 202 and generating multiple vector representations corresponding to multiple image representations of individuals included in the set of target images, as described above with reference to block 204.

Continuing with the description of block 204, once all target images in the set are processed by the FRM, multiple vector representations representing all individual appearances in the set are obtained. In some cases, each vector representation can be assigned with a distinctive index number. An image reference number from which the vector is generated is also referenced with respect to the vector representation. For example, processing image number 325 which includes 2 individuals can result in an entry of [325, $V_{121}, V_{122}$]. The reference to the image number is necessary for tracing back the vector and the represented individual to the relevant image. After processing all the images in the set (assuming there are L images in the set), L entries can be obtained, each including an image reference number and one or more vectors representing the individuals appearing in the respective image, as exemplified above. It can be expected that the number of vectors can be greater than the number of images L as each image includes at least one individual. It can be also expected that the actual number of unique individuals K is smaller than the number of vectors, as some people may appear more than once within the set of target images. Thus one or more vector representations in the multiple vector representations, although being different from each other (e.g., due to issues related to image qualities, different appearances/perspectives, FRM accuracy, etc.), may actually represent the same unique individual.

In order to derive the unique individuals included in the set, the multiple vector representations can be clustered (206) (e.g., by the relationship analyzer 106 in PMC 102, as illustrated in FIG. 1) to a plurality of clusters of vector representations corresponding to a plurality of unique individuals included in the set of target images using a similarity measure. Accordingly, for each target image, one or more unique individuals associated therewith can be obtained.

When all the vector representations are projected in a Q-dimensional space, it can be expected to observe K clusters corresponding to K unique individuals included in the set of images. In some embodiments, in order to draw the border lines between clusters and deduce the vector representations that are associated with the same unique individual, a measurement methodology can be established. By way of example, a similarity matrix can be generated using a similarity measure, the similarity matrix comprising elements each indicative of similarity between a respective pair of vector representations. For one or more vector representations that are indicated to be similar by the similarity matrix, it can be determined that these vector representations represent the same unique individual. The similarity measure is the measure of how much alike two data objects (e.g., two vectors) are. For instance, similarity measure can be based on distance measurement where, when the distance is small, this indicates high degree of similarity, while large distance indicates low degree of similarity.

By way of example, the similarity measure can be implemented using two functions: a distance function d(u,v) which can measure adjacency between 2 vectors, and a threshold function h(x) which, based on certain threshold settings, can output 1 or 0 depending on whether the threshold is being crossed or not. For example, the distance function can be based on an Euclidean distance measurement and the threshold function can be based on comparison calculation. For purpose of illustration, assume that there are m vectors in total in the multiple vector representations. A similarity matrix D with a dimension of m×m can be created, in which each element $D_{ij}$=h[d(u,v)]. It is to be noted that all diagonal values can be set to zero. Any element $D_{ij}$ with a value 1 indicates similarity between the corresponding vector indices i and j. An exemplified illustration of deriving unique individuals included in a set of target images using this methodology is now described with reference to FIG. 6, in accordance with certain embodiments of the presently disclosed subject matter.

In the example, assume that the set of target images includes four images. The first image (image #1) includes one individual represented by a vector representation V1, the second (image #2) and third images (image #3) each include 2 individuals represented respectively by V2, V3, and V4, V5, and the fourth image (image #4) includes 3 individuals represented by V6, V7 and V8. The entries of the image set is exemplified in table 601.

A similarity matrix can be generated as follows, using the above described methodology:

$$D = \begin{bmatrix} 0 & 1 & 0 & 0 & 0 & 0 & 0 & 1 \\ 1 & 0 & 0 & 1 & 0 & 0 & 0 & 0 \\ 0 & 0 & 0 & 0 & 1 & 0 & 1 & 0 \\ 0 & 1 & 0 & 0 & 0 & 0 & 0 & 0 \\ 0 & 0 & 1 & 0 & 0 & 0 & 0 & 0 \\ 0 & 0 & 0 & 0 & 0 & 0 & 0 & 0 \\ 0 & 0 & 1 & 0 & 0 & 0 & 0 & 0 \\ 1 & 0 & 0 & 0 & 0 & 0 & 0 & 0 \end{bmatrix}$$

As illustrated, the $1^{st}$ row (corresponding to V1) shows that V1, V2 and V8 are similar (i.e., the values of elements $D_{12}$ and $D_{18}$ are 1). The $2^{nd}$ row shows that in addition, V2 is similar to V4 (i.e., in addition to $D_{21}$=1, element $D_{24}$ also has a value of 1). Continuing with the $3^{rd}$ row, it is shown that V3 is similar to V5 and V7. In this example, V4 is shown (from $4^{th}$ row) as being similar to V2 but is not shown to have the same similarity to V1 or V8 (due to distance measurements). The determination of similar vectors can be realized by various techniques and for purpose of illustration and simplicity, in the present example, vectors which demonstrate similarity to each other (i.e., indicated by a corresponding element with a value of 1 in the matrix) are determined to be similar vectors, thus representing the same unique individual. For instance, in the present example, V1, V2, V4, V8 are similar and represent the same unique individual #1 (denoted as P1). V3, V5 and V7 are similar and represent the same unique individual #2 (denoted as P2). In addition V6 is unique and has no similar peers. Therefore V6 can represent unique individual #3 (denoted as P3).

Table 602 can be derived from Table 601 based on the above similarity determination. As shown in table 602, since image #1 is associated with a vector representation V1 which, based on the similarity measure, represent P1, thus it can be derived that image #1 includes a unique individual P1. Similarly, it can be derived that image #2 and image #3 both include unique individuals P1 and P2. Image #4 includes unique individuals P1, P2 and P3. Therefore, the unique individuals associated with each target image are obtained, as described with reference to block 206.

Optionally, an additional or alternative table in which each row entry represents a unique individual and has an associated list of appearances within the set of images can be created as follows:

P1: (1,V1),(2,V2),(3,V4),(4,V8)
P2: (2,V3),(3,V5),(4,V7)
P3: (4,V6)

The table includes three rows representing three unique individuals. The $1^{st}$ row shows appearances of person P1 in images 1,2,3 &4 (and the corresponding vector representations of this individual). The $2^{nd}$ row shows the appearances of person P2 in photos 2, 3 & 4 (and the corresponding vector representations of this individual). The $3^{rd}$ row shows the appearance of person P3 in image #4. In some cases a simplified format of the table can be used if the vectors are not needed for further calculations:

P1: (1),(2),(3),(4)
P2: (2),(3),(4)
P3: (4)

It is to be noted that the table representation illustrated above and in FIG. 6 is for illustration and exemplary purposes only, and should not be construed as limiting the present disclosure in any way. Other suitable forms of data structure representations capable of illustrating associations between the images and included individuals can be used in addition to or in lieu of the above.

Having described deriving unique individuals associated with each target image, there is now described deducing relationships between these unique individuals based on the target images which are expected to comprise information reflecting social interactions between individuals appearing in the images.

Referring back to FIG. 2, for each given target image of at least one subset of the set of target images, a set of image parameters characterizing the given target image can be obtained (210) (e.g., by the relationship analyzer 106 in PMC 102). In some embodiments, the set of image parameters can include at least one computed parameter indicative of a relationship measurement between the one or more unique individuals associated with the given target image. A computed parameter refers to a parameter that is obtained by processing and analyzing target image(s). This type of parameter is not directly accessible/extractable from the image without performing a certain amount of computation, as compared to the physical parameters of the image, which will be described below. Computed parameters are typically associated with the relative aspects of individuals appearing in a single target image or within the full set of target images. In some cases, certain computed parameters can be presented in matrix format (indicative of relational parameters between individuals included in the image). In one embodiment, the at least one computed parameter can include a distance matrix indicative of relative distances between the one or more unique individuals associated with the given target image. For instance, the distance matrix M can be in the dimension of n×n where n refers to the number of unique individuals included in the target image. Each element $M_{ij}$ in the matrix can represent a relative distance measurement (e.g., Euclidean distance) between the two corresponding individuals i and j. In another embodiment, the at least one computed parameter can refer to a subset of computed parameters which, in addition to the distance matrix, can further include one or more additional computed parameters selected from a group comprising: number of unique individuals associated therewith, individual-specific vector, and image-related vector, etc. By way of example, the parameter of number of unique individuals associated with the given target image can be only obtained after the computation processes of facial recognition and clustering as described above. The individual-specific vector may comprise n components which can represent certain characteristics/measurements of the corresponding individual, whereas the image-related vector can represent certain characteristics/measurements of the target image which are not individual-specific.

In certain embodiments, in addition to the at least one computed parameter, the set of image parameters can further include a subset of pre-submitted parameters and/or a subset of physical parameters.

Pre-submitted parameters refer to image parameters which were previously submitted and accompany each image. For example, pre-submitted parameters can include tagged individual information included in the image, which were submitted when tagging images during the FRM training stage. Another example can be a pre-submitted significance parameter, indicating the importance level of one image relative to other images. This can be used to weight the overall inputs (e.g., when calculating global relationship based on local relationship) which might be deduced/increased from one image versus other images especially when the information is contradictive or partial, as will be exemplified below.

Physical parameters refer to parameters related to the physical characteristics of the image that can be easily extracted from the image itself without performing further computation. These parameters can include, e.g., original image size, image resolution, overall quality, image taken date etc.

Once the set of image parameters are obtained, a local relationship matrix can be generated (212) (e.g., by the relationship analyzer 106 in PMC 102) using the set of image parameters. The local relationship matrix can be representative of local mutual relationships between the one or more unique individuals included or associated with the given target image. In some cases, the local relationship matrix can be informative of strength of the local mutual relationships between the one or more unique individuals. For instance, the distance matrix can be used as an indication of strength of local relationships between individuals. In some embodiments, for each given target image, a weight can be derived using the set of image parameters, the weight being indicative of significance of the given target image (note that the weight is a computed parameter which is different from the pre-submitted significance parameter). The weight can be used when generating a global relationship matrix, as described below with reference to block 214. Once all target images are analyzed, a set of local relationship matrices corresponding to the at least one subset of target images are thereby obtained (208).

Figure 7:
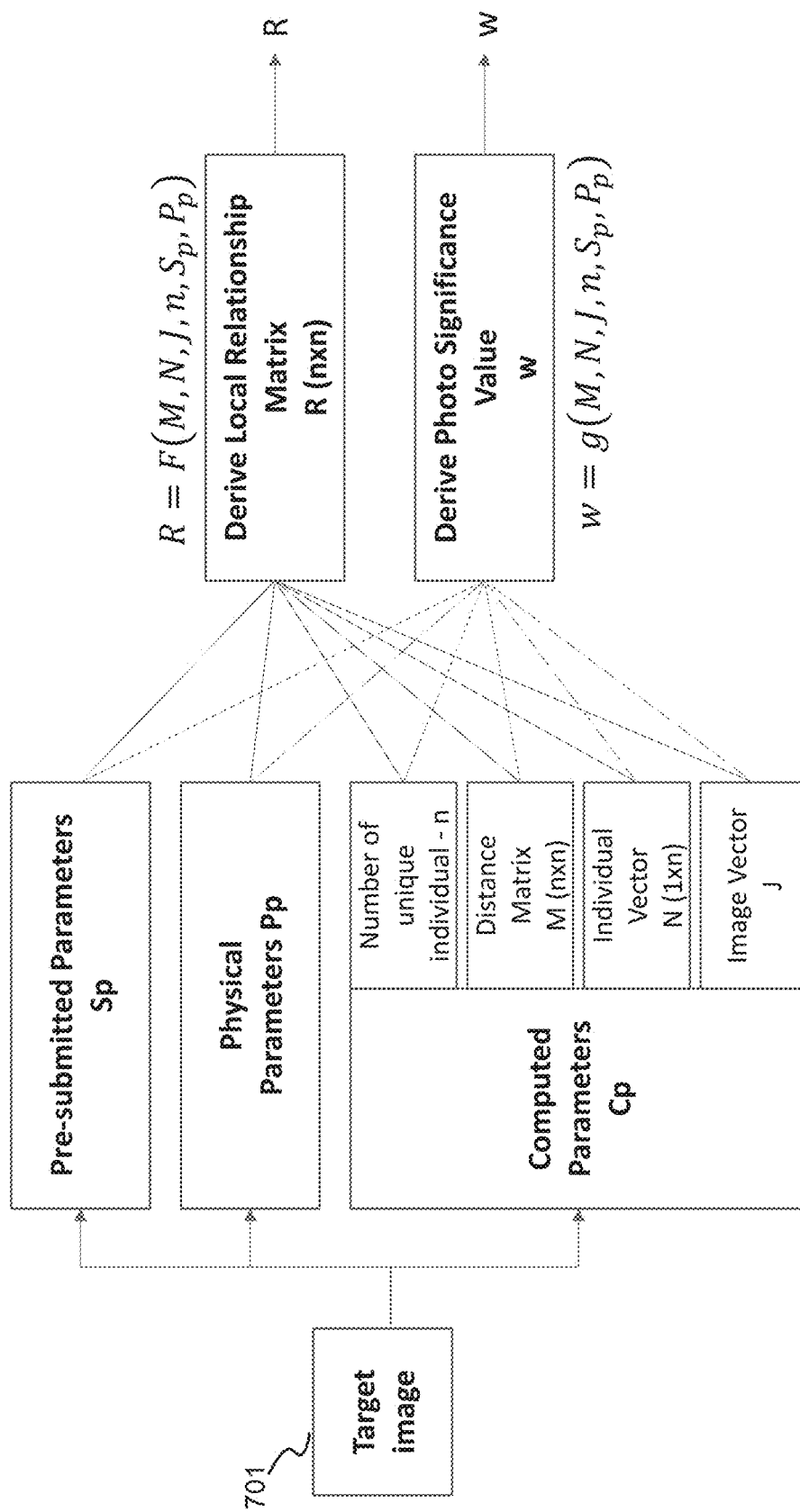
FIG. 7 is a schematic illustration of exemplified image parameters and generation of a local relationship matrix using the parameters, in accordance with certain embodiments of the presently disclosed subject matter.

Turning now to FIG. 7, there is illustrated a schematic illustration of exemplified image parameters and generation of a local relationship matrix using the parameters in accordance with certain embodiments of the presently disclosed subject matter.

As illustrated, for a given target image 701, there are shown three possible subsets of image parameters, including pre-submitted parameters Sp, physical parameters Pp, and computed parameters Cp. The computed parameters Cp can further include one or more of the following: number of unique individuals included in the target image (n), distance matrix (M–n×n), individual vector N (1×n) and image vector J, as described above. A local relationship matrix R and a photo significance value w (i.e., the weight of the target image) can be derived using at least some of the set of image parameters, for instance: $R=F(M,N,J,S_p,P_p)$, $w=g(M,N,J,S_p,P_p)$. In one example, the significance value of each photo can be set as $w_i=1$ for all photos. In another example, it can also be decided to use only computed parameters, for instance, the distance matrix M, for assessing the relationships. In a simple form, one can set R=M, meaning that only the measurements between individuals in the photo are directly influencing the local relationship matrix. In a further simplified example, if all the non-diagonal elements M matrix have a value of 1 (and diagonal elements having a value of 0), this actually refers to the case in which only appearances are counted in the photo (i.e., $M_{ij}=1$ means that Pi and Pj are connected due to their mutual appearance).

A global relationship matrix can be generated (214) (e.g., by the relationship analyzer 106 in PMC 102) by combining the set of local relationship matrices. The global relationship matrix can be representative of relationships between the plurality of unique individuals included in the set of target images. In some embodiments, the global relationship matrix has a dimension corresponding to the number of unique individuals. The global relationship matrix can be generated by mapping each local relationship matrix into the dimension according to the index of the unique individuals associated therewith in the global relationship matrix.

Figure 8:
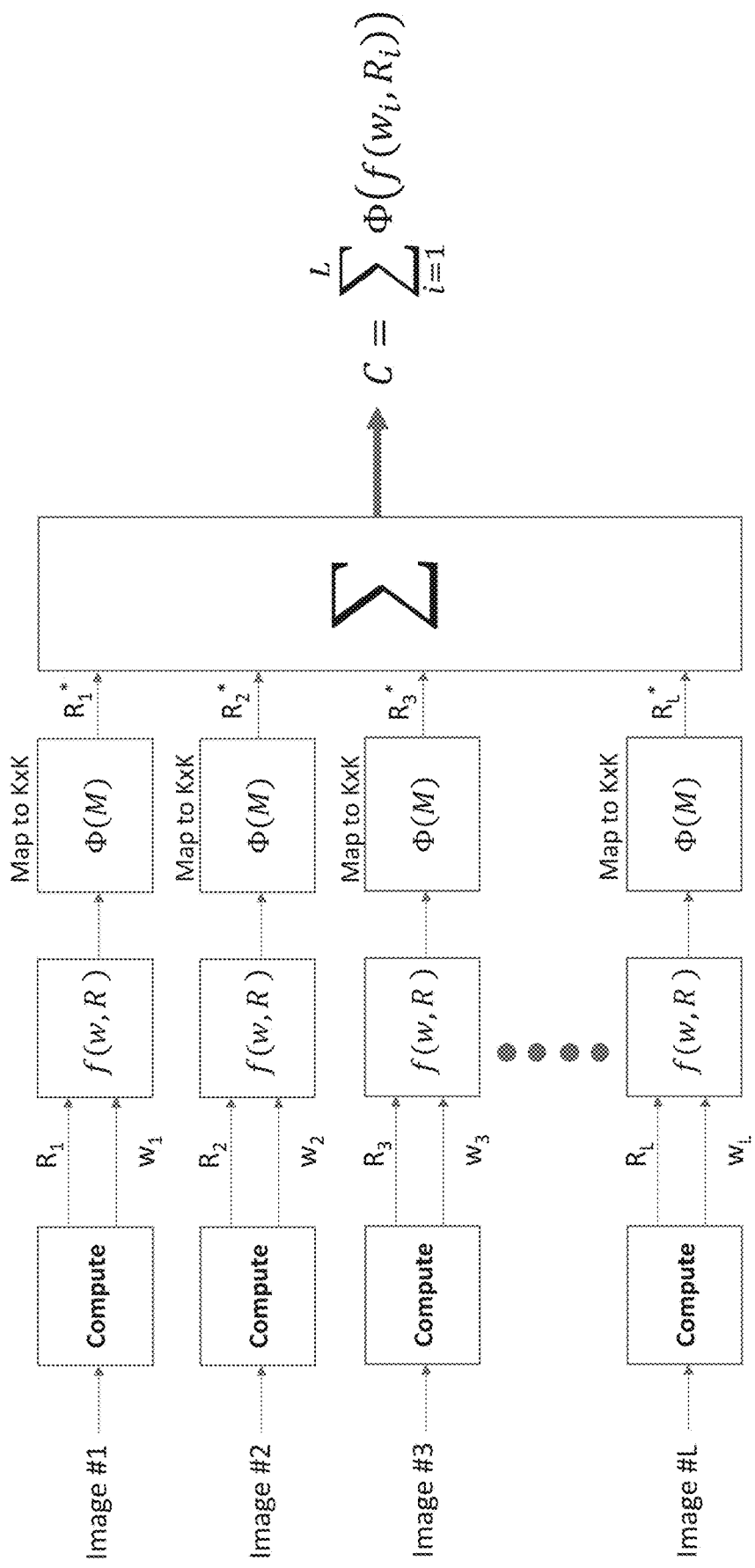
FIG. 8 is a schematic illustration of generation of a global relationship matrix based on the local relationship matrices in accordance with certain embodiments of the presently disclosed subject matter.

Referring now to FIG. 8, there is illustrated a schematic illustration of generation of a global relationship matrix based on the local relationship matrices in accordance with certain embodiments of the presently disclosed subject matter.

For each given image #i, the local relationship matrix Ri represents the local relationships between unique individuals appearing in the associated image. Therefore, when being combined to the global relationship matrix C (e.g., having a dimension of k×k), only the relevant rows and columns of C which relate to those individuals (i.e., the individuals appearing in the given image) are affected according to the significance thereof. For example, if an image #7 includes P1, P3 and P4, then only $C_{13}$, $C_{14}$, $C_{34}$ (and their transposed locations) can be directly impacted by $R_7$. The significance $w_7$ of image #7 may increase/enhance or decrease the contribution of $R_7$ to C in general. It is acknowledged that the dimensions of Ri are smaller (or equal) to the dimensions of C as Ri only relates to part of the individuals, while C relates to all individuals appearing in the set of images. In FIG. 8, the transformation $R^*=\Phi(R)$ is denoted as the mapping of R into a larger k×k matrix, placing its elements in the corresponding places in the larger matrix.

Figure 6:
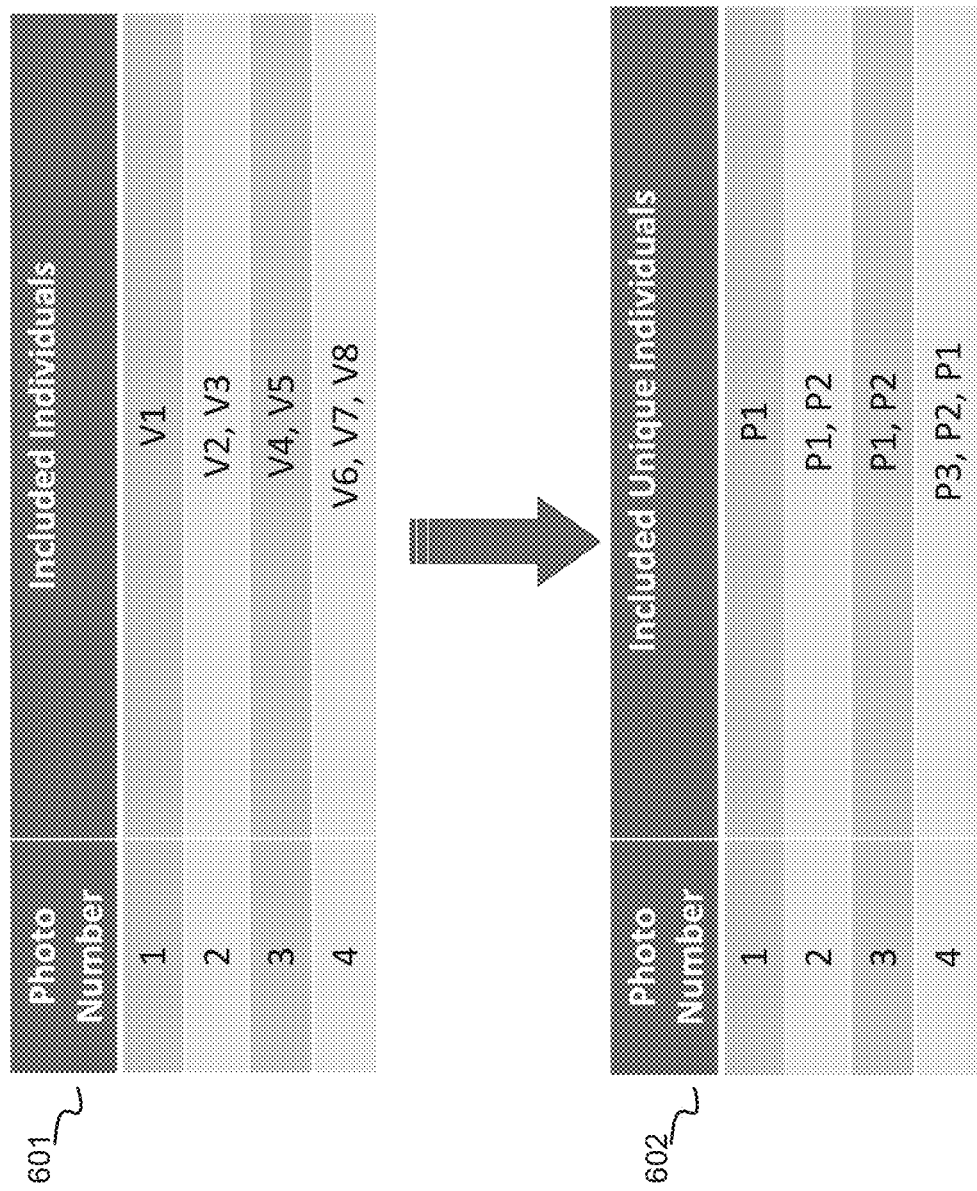
FIG. 6 shows an exemplified illustration of deriving unique individuals included in a set of target images in accordance with certain embodiments of the presently disclosed subject matter.

For example, in the previous example with reference to FIG. 6, one of the images (e.g., image #2) only addressed 2 out of 3 unique individuals:

[2: P1, P2]

The local relationship matrix $R_2$ can be presented as $$\begin{bmatrix} 0 & 1 \\ 1 & 0 \end{bmatrix}.$$

As these values should only affect elements located in (1,1), (1,2), (2,1) and (2,2) in global relationship matrix C, the mapping of $R_2$ into C will be:

$$R_2^* = \Phi\left\{\begin{bmatrix} 0 & 1 \\ 1 & 0 \end{bmatrix}\right\} = \begin{bmatrix} 0 & 1 & 0 \\ 1 & 0 & 0 \\ 0 & 0 & 0 \end{bmatrix}$$

In general, the computation of C will be: $C=\Sigma_{i=1}^{L}\Phi(f(w_i, R_i))$, where f(.,.) is a weighting function which calibrates the contribution of the local relationship matrix according to its significance/weight. For example, one possible implementation can be f(a,R)=a*R. In cases where the significance metrics are ignored, f(a,R)=R.

Figure 9:
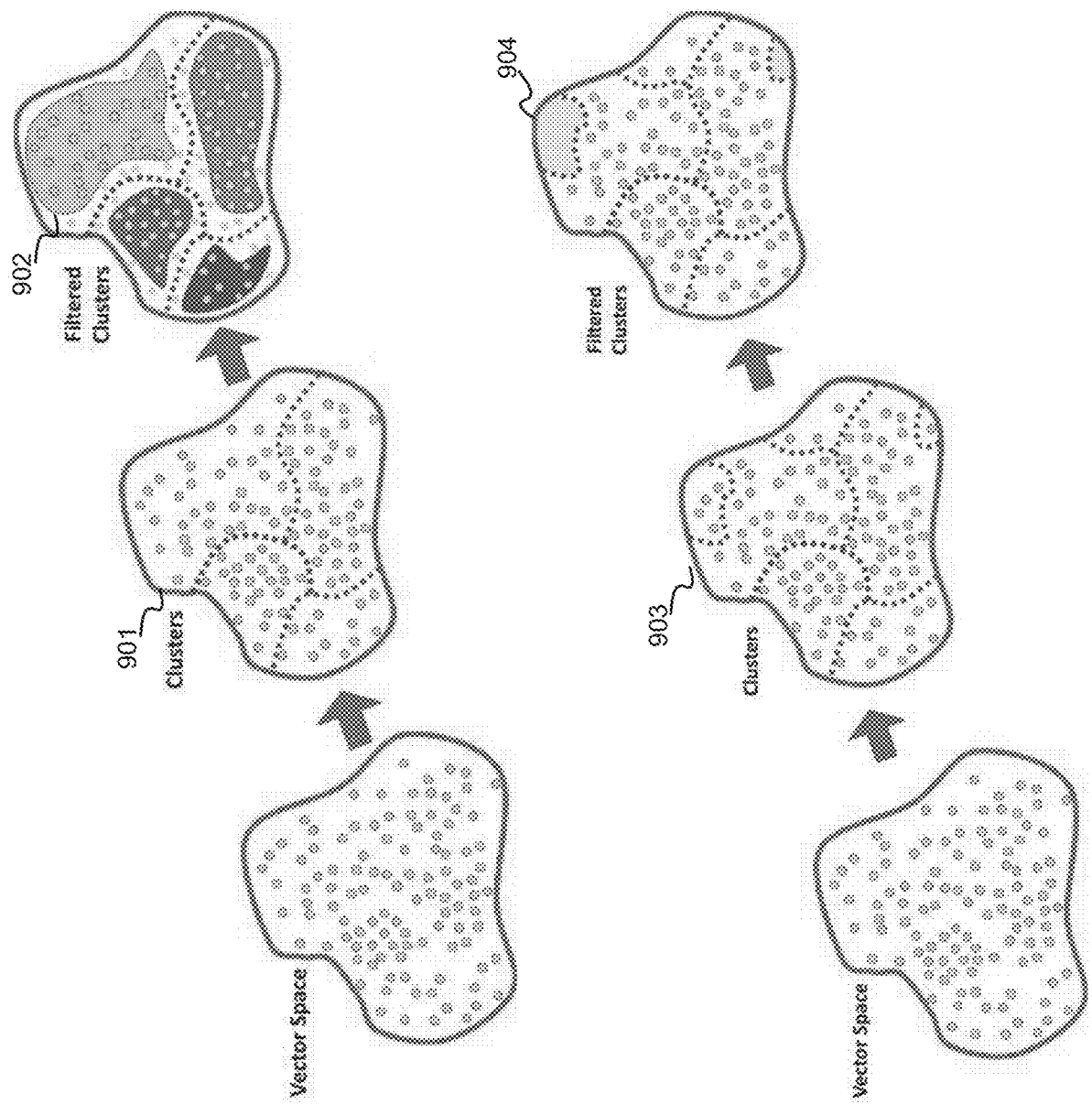
FIG. 9 illustrates two examples of filtration of the set of images based on the clusters in accordance with certain embodiments of the presently disclosed subject matter.

In some cases, not each target image in the set is used for deriving the relationships between individuals. After obtaining the plurality of clusters of vector representations corresponding to a plurality of unique individuals included in the set of target images, the set of target images can be filtered based on the plurality of clusters, giving rise to a filtered subset, and the relationship analysis (e.g., parameter extraction, generation of local relationship matrix, etc.) is performed for each image in the at least filtered subset. The filtering of the set of target images can be performed in various ways. FIG. 9 illustrates two examples of filtration of the set of images based on the clusters in accordance with certain embodiments of the presently disclosed subject matter.

In the upper illustration, once the plurality of clusters 901 are obtained, the filtration is performed for each cluster, e.g., by setting a border line 902 or threshold based on certain distance measurement, as described above with reference to FIG. 4, thereby generating filtered clusters constituting the filtered subset of images. In the lower illustration, one cluster 904 out of the plurality of clusters 903 is filtered out, possibly due to significance or other related parameters thereof.

In some embodiments, once the global relationship matrix is generated, a social map can be depicted based on the global relationship matrix. The social map is a graphical representation of relationships between the plurality of unique individuals included in the set of target images.

Continuing with the above illustrated example, table 602 which shows the unique individuals associated with each target image is illustrated below in a simplified form:

[1: P1]
[2: P1, P2]
[3: P1, P2]
[4: P3, P2, P1]

If there are no additional image information or parameters being added, local relationship matrices can be generated based on the above records (in which the non-diagonal elements have a value of 1, referring to the case in which only appearances/occurrences are counted in the images, as described above), and a global relationship matrix can be generated as below:

$$C = \begin{bmatrix} 0 & 2 & 1 \\ 2 & 0 & 1 \\ 1 & 1 & 0 \end{bmatrix}$$

An element in C with a value 1 indicates a single occurrence of a relationship (mutual appearance in one photo) while a value of 2 indicates a double occurrence. For example $C_{12}$ indicates that P1 and P2 appeared together in two different images. A first social map 1001 can be depicted based on the above C, as illustrated in FIG. 10, where a thicker line between P1 and P2 indicates a stronger relationship, as compared to the connections between P1 and P3, and P2 and P3.

There is now illustrated an exemplified case where more image parameters are obtained. For instance, a pre-submitted significance parameter indicative of a importance level of the images can be applied on the above records (the parameter having values of 0-5, with 5 being of highest importance):

0-[1: P1]
2-[2: P1, P2]
1-[3: P1, P2]
5-[4: P3, P2, P1]

Additionally, a physical parameter which relates to the date of the photo being taken can also be added. In this example, 'R' is used to represent a recent photo (less than a month), 'Y' is used to represent a photo taken in the past year, and 'O' for an older photo.

0 Y-[1: P1]
2 O-[2: P1, P2]
1 O-[3: P1, P2]
5 R-[4: P3, P2, P1]

Furthermore, a computed parameter, i.e., the relative distances $d_{ij}$ distance between unique individuals $P_i$ and $P_j$ can be calculated from each photo, and added:

0 Y-[1: P1]
2 O-[2: P1, P2] d12=0.32
1 O-[3: P1, P2] d12=0.3
5 R-[4: P3, P2, P1] d12=0.4 d13=0.05 d23=0.07

In this case it is quite apparent that the 4$^{th}$ photo highly emphasizes the relationship of P3 with the P1 and P2—the photo is flagged with high significance (e.g., the significance parameter has a value of 5), it is recent, and the distances between P3 and the others are relatively short which may be indicative of a closer relationship. In such cases, calculation of the strength of the relationship can be affected, and the C matrix may appear as:

$$C = \begin{bmatrix} 0 & 1.5 & 2.2 \\ 1.5 & 0 & 1.7 \\ 2.2 & 1.7 & 0 \end{bmatrix}$$

A second social map 1002 can be depicted based on the updated C, as illustrated in FIG. 10, in which the connection between P1 and P3, as well as the connection between P2 and P3 are enhanced, thereby showing a more balanced relationship among the three individuals.

It is to be noted that tuning/training of the FRM does not need to be limited to the training set of images used in the initial stage. In runtime, through the process of processing new image batches, the system identifies photos which are likely to include the same individual. In the previous example with reference to FIG. 6, it is shown that in four images there are eight vector representations, but actually only three unique individuals are included. P1 is actually V1, V2, V4 and V8 while P2 is actually V3, V5 and V7. Therefore, there are 4 photos of P1 (appearing in all photos) and 3 photos of P2 (appearing in all besides the first one). Hence when there are multiple photos of the same individual as deduced in runtime (post tuning), these photos could be used for tuning the FRM at a later stage.

It is appreciated that the examples and embodiments illustrated with reference to the relationship analysis process in the present description are by no means inclusive of all possible alternatives but are intended to illustrate non-limiting examples only.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer readable memory or storage medium tangibly embodying a program of instructions executable by the computer for executing the method of the invention.

The non-transitory computer readable storage medium causing a processor to carry out aspects of the present invention can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Those skilled in the art will readily appreciate that various modifications and changes can be applied to the embodiments of the invention as hereinbefore described without departing from its scope, defined in and by the appended claims.

The invention claimed is:

1. A computerized method of image-based relationship analysis, comprising:
   obtaining a set of target images each including one or more image representations of one or more individuals;
   obtaining, for each image representation in each target image, a corresponding vector representation generated by a Facial Recognition Model (FRM), thereby providing multiple vector representations corresponding to multiple image representations of individuals included in the set of target images;
   clustering the multiple vector representations to a plurality of clusters of vector representations corresponding to a plurality of unique individuals included in the set of target images using a similarity measure, and obtaining, for each target image, one or more unique individuals associated therewith;

for each given target image of at least one subset of the set, obtaining a set of image parameters characterizing the given target image, wherein the set of image parameters includes at least one computed parameter indicative of a relationship measurement between the one or more unique individuals associated with the given target image;

generating a local relationship matrix using the set of image parameters, wherein the local relationship matrix is representative of local mutual relationships between the one or more unique individuals;

thereby obtaining a set of local relationship matrices corresponding to the at least one subset of target images; and generating a global relationship matrix by combining the set of local relationship matrices, the global relationship matrix being representative of relationships between the plurality of unique individuals;

wherein the FRM is trained using a training set of images targeted for a specific group of individuals, each image in the training set is pre-tagged with one or more unique individuals included therein, and the training set of images comprises a plurality of subsets of images, each subset pre-tagged with a respective individual from the specific group, and wherein the plurality of subsets of images are filtered prior to being used for training the FRM so as to increase accuracy of the FRM, and wherein the FRM is trained by:

for each given subset of images pre-tagged with a respective individual:

feeding the FRM with the given subset of images to obtain a cluster of vector representations representing the respective individual in the given subset of images;

applying a similarity measure to the cluster giving rise to a reduced cluster of vector representations corresponding to a filtered subset of images;

thereby obtaining a plurality of filtered subsets corresponding to respective individuals; and feeding the FRM with the plurality of filtered subsets so as to train the FRM.

2. The computerized method of claim 1, further comprising depicting a social map based on the global relationship matrix, wherein the social map is a graphical representation of relationships between the plurality of unique individuals.

3. The computerized method of claim 1, wherein the obtaining a corresponding vector representation comprises, for each given target image, generating, using the FRM, a vector representation corresponding to each image representation of an individual included therein.

4. The computerized method of claim 1, wherein the similarity measure is applied by measuring a distance between each vector representation and center of the cluster, and comparing the distance with a threshold.

5. The computerized method of claim 1, wherein the clustering comprises generating a similarity matrix comprising elements each indicative of similarity between a respective pair of vector representations using the similarity measure, and determining one or more vector representations that are indicated to be similar by the similarity matrix representing the same unique individual.

6. The computerized method of claim 1, further comprising filtering the set of target images based on the plurality of clusters, giving rise to the at least one subset.

7. The computerized method of claim 1, wherein the at least one computed parameter includes a distance matrix indicative of relative distances between the one or more unique individuals associated with the given target image.

8. The computerized method of claim 7, wherein the at least one computed parameter further includes one or more additional computed parameters selected from a group comprising: number of unique individuals associated therewith, individual-specific vector, and image-related vector.

9. The computerized method of claim 1, wherein the set of image parameters further includes a subset of pre-submitted parameters and/or a subset of physical parameters.

10. The computerized method of claim 1, wherein the local relationship matrix is informative of strength of the local mutual relationships between the one or more unique individuals.

11. The computerized method of claim 1, further comprising, for each given target image, deriving a weight using the set of image parameters, the weight being indicative of significance of the given target image, and wherein the global relationship matrix is generated by combining the local relationship matrix corresponding to each target image with respect to the respective weight thereof.

12. The computerized method of claim 1, wherein the global relationship matrix has a dimension corresponding to the number of unique individuals, and the global relationship matrix is generated by mapping each local relationship matrix into the dimension according to an index of the unique individuals associated therewith in the global relationship matrix.

13. A computerized system of image-based relationship analysis, the system comprising a processing and memory circuitry (PMC) configured to:

obtain a set of target images each including one or more image representations of one or more individuals;

obtain, for each image representation in each target image, a corresponding vector representation generated by a Facial Recognition Model (FRM), thereby providing multiple vector representations corresponding to multiple image representations of individuals included in the set of target images;

cluster the multiple vector representations to a plurality of clusters of vector representations corresponding to a plurality of unique individuals included in the set of target images using a similarity measure, and obtaining, for each target image, one or more unique individuals associated therewith;

for each given target image of at least one subset of the set, obtain a set of image parameters characterizing the given target image, wherein the set of image parameters includes at least one computed parameter indicative of a relationship measurement between the one or more unique individuals associated with the given target image;

generate a local relationship matrix using the set of image parameters, wherein the local relationship matrix is representative of local mutual relationships between the one or more unique individuals;

thereby obtaining a set of local relationship matrices corresponding to the at least one subset of target images; and generate a global relationship matrix by combining the set of local relationship matrices, the global relationship matrix being representative of relationships between the plurality of unique individuals;

wherein the FRM is trained using a training set of images targeted for a specific group of individuals, each image in the training set is pre-tagged with one or more unique individuals included therein, and the training set of images comprises a plurality of subsets of images, each subset pre-tagged with a respective individual from the specific group, and wherein the plurality of subsets of images are filtered prior to being used for training the FRM so as to increase accuracy of the FRM, and wherein the FRM is trained by:

for each given subset of images pre-tagged with a respective individual:
 feeding the FRM with the given subset of images to obtain a cluster of vector representations representing the respective individual in the given subset of images;
 applying a similarity measure to the cluster giving rise to a reduced cluster of vector representations corresponding to a filtered subset of images;
thereby obtaining a plurality of filtered subsets corresponding to respective individuals; and
feeding the FRM with the plurality of filtered subsets so as to train the FRM.

14. The computerized system of claim 13, wherein the PMC is further configured to depict a social map based on the global relationship matrix, wherein the social map is a graphical representation of relationships between the plurality of unique individuals.

15. The computerized system of claim 13, wherein the PMC is configured to obtain a corresponding vector representation by generating, for each given target image, using the FRM, a vector representation corresponding to each image representation of an individual included therein.

16. The computerized system of claim 13, wherein the similarity measure is applied by measuring a distance between each vector representation and center of the cluster and comparing the distance with a threshold.

17. The computerized system of claim 13, wherein the PMC is configured to cluster the multiple vector representations by generating a similarity matrix comprising elements each indicative of similarity between a respective pair of vector representations using the similarity measure, and determining one or more vector representations that are indicated to be similar by the similarity matrix representing the same unique individual.

18. The computerized system of claim 13, wherein the PMC is further configured to filter the set of target images based on the plurality of clusters, giving rise to the at least one subset.

19. The computerized system of claim 13, wherein the at least one computed parameter includes a distance matrix indicative of relative distances between the one or more unique individuals associated with the given target image.

20. The computerized system of claim 19, wherein the at least one computed parameter further includes one or more additional computed parameters selected from a group comprising: number of unique individuals associated therewith, individual-specific vector, and image-related vector.

21. The computerized system of claim 13, wherein the set of image parameters further includes a subset of pre-submitted parameters and/or a subset of physical parameters.

22. The computerized system of claim 13, wherein the local relationship matrix is informative of strength of the local mutual relationships between the one or more unique individuals.

23. The computerized system of claim 13, wherein the PMC is further configured to: for each given target image, derive a weight using the set of image parameters, the weight being indicative of significance of the given target image, wherein the global relationship matrix is generated by combining the local relationship matrix corresponding to each target image with respect to the respective weight thereof.

24. The computerized system of claim 13, wherein the global relationship matrix has a dimension corresponding to the number of unique individuals, and the global relationship matrix is generated by mapping each local relationship matrix into the dimension according to an index of the unique individuals associated therewith in the global relationship matrix.

25. A non-transitory computer readable medium comprising instructions that, when executed by a computer, cause the computer to perform a method of image-based relationship analysis, the method comprising:

obtaining a set of target images each including one or more image representations of one or more individuals;
obtaining, for each image representation in each target image, a corresponding vector representation generated by a Facial Recognition Model (FRM), thereby providing multiple vector representations corresponding to multiple image representations of individuals included in the set of target images;
clustering the multiple vector representations to a plurality of clusters of vector representations corresponding to a plurality of unique individuals included in the set of target images using a similarity measure, and obtaining, for each target image, one or more unique individuals associated therewith;
for each given target image of at least one subset of the set,
 obtaining a set of image parameters characterizing the given target image, wherein the set of image parameters includes at least one computed parameter indicative of a relationship measurement between the one or more unique individuals associated with the given target image;
 generating a local relationship matrix using the set of image parameters, wherein the local relationship matrix is representative of local mutual relationships between the one or more unique individuals;
thereby obtaining a set of local relationship matrices corresponding to the at least one subset of target images; and
generating a global relationship matrix by combining the set of local relationship matrices, the global relationship matrix being representative of relationships between the plurality of unique individuals;
wherein the FRM is trained using a training set of images targeted for a specific group of individuals, each image in the training set is pre-tagged with one or more unique individuals included therein, and the training set of images comprises a plurality of subsets of images, each subset pre-tagged with a respective individual from the specific group, and wherein the plurality of subsets of images are filtered prior to being used for training the FRM so as to increase accuracy of the FRM, and wherein the FRM is trained by:

for each given subset of images pre-tagged with a respective individual:
 feeding the FRM with the given subset of images to obtain a cluster of vector representations representing the respective individual in the given subset of images;

applying a similarity measure to the cluster giving rise to a reduced cluster of vector representations corresponding to a filtered subset of images;
thereby obtaining a plurality of filtered subsets corresponding to respective individuals; and
feeding the FRM with the plurality of filtered subsets so as to train the FRM.

* * * * *